Aug. 23, 1938.    R. G. MOORE    2,127,610
ADJUSTABLE SEAT SLIDE
Filed Feb. 28, 1938    2 Sheets-Sheet 1
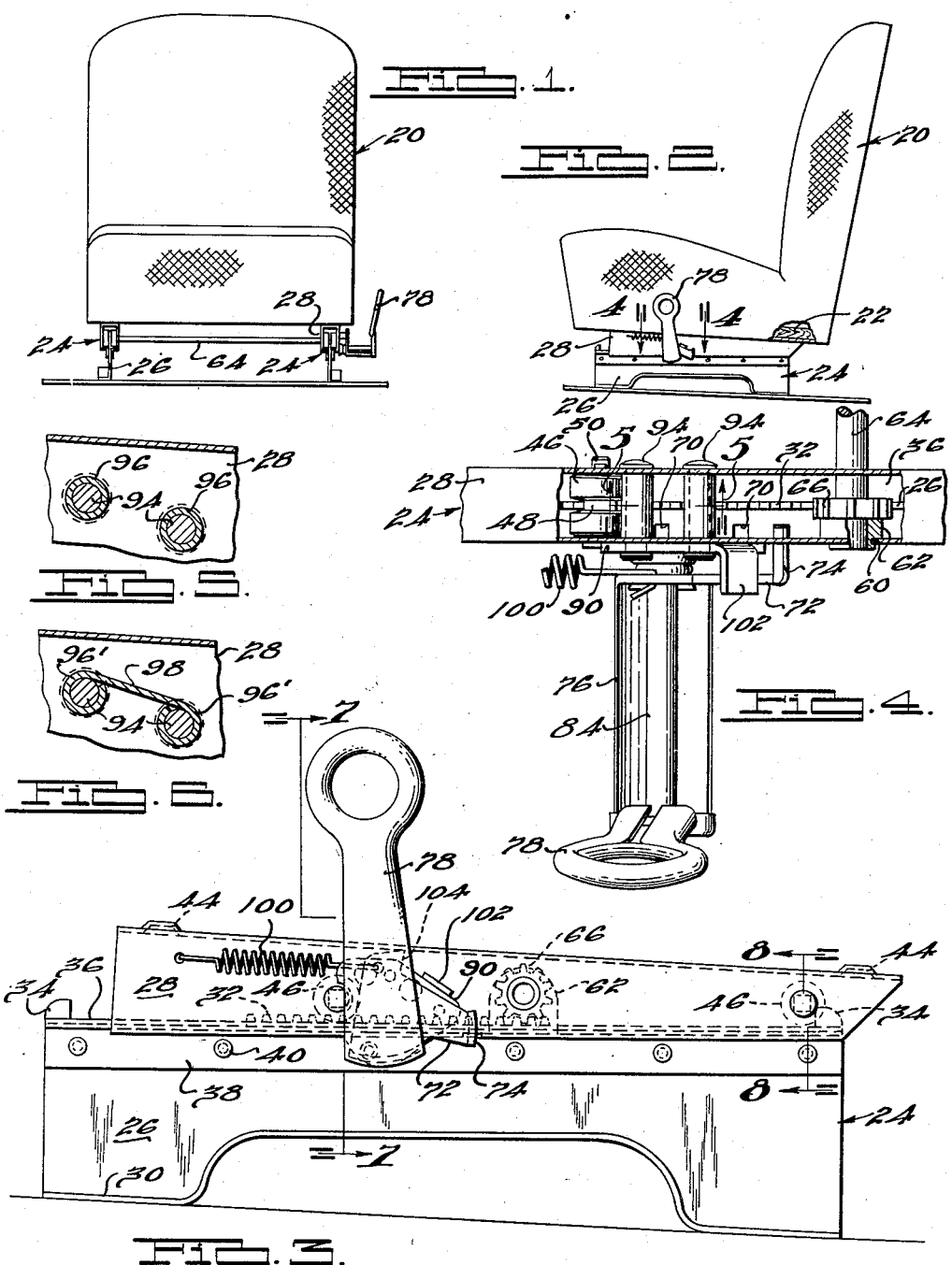
INVENTOR
Raymond G. Moore.
BY
Harness, Dickey & Pierce
ATTORNEYS.

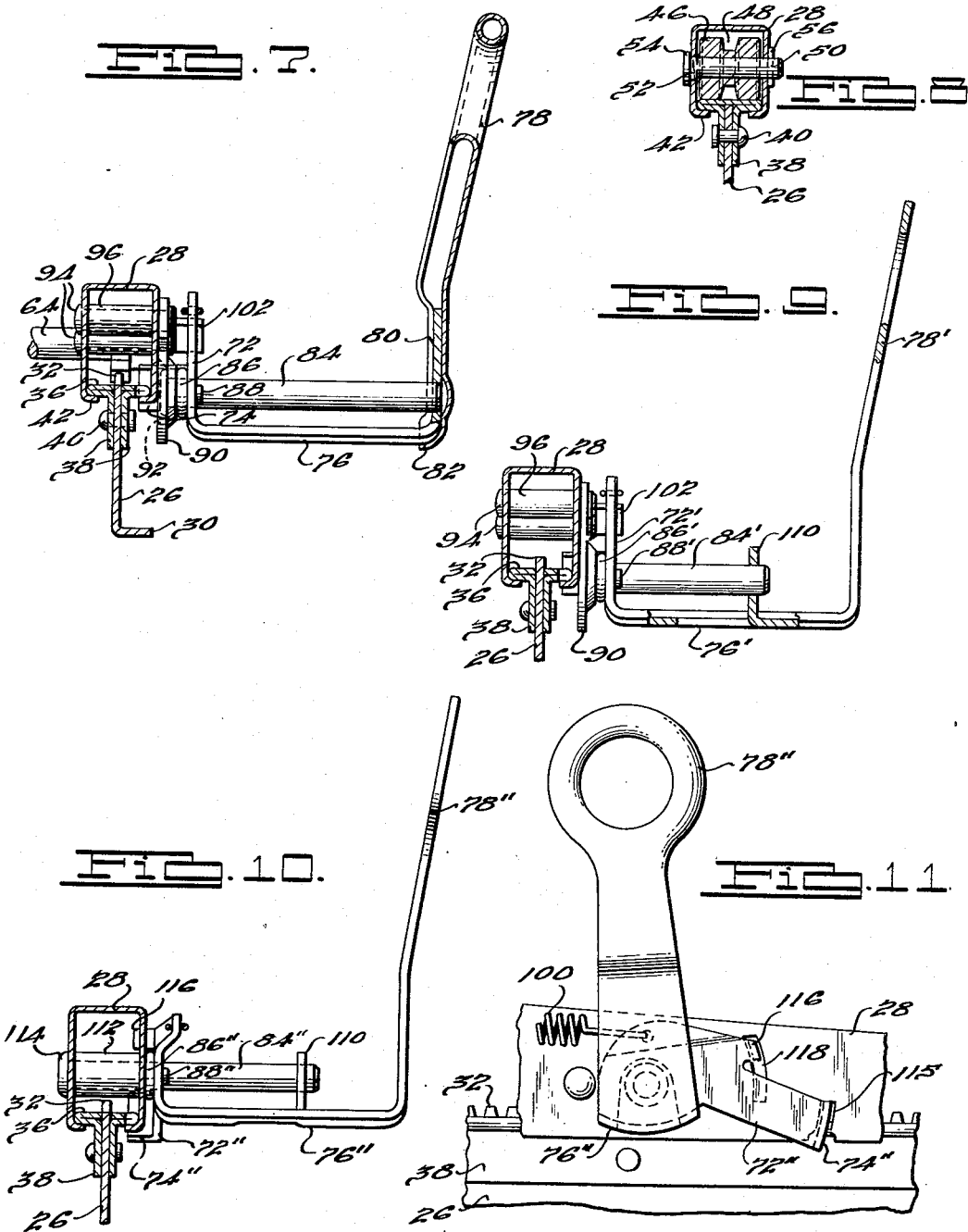

Patented Aug. 23, 1938

2,127,610

UNITED STATES PATENT OFFICE 2,127,610

ADJUSTABLE SEAT SLIDE

Raymond G. Moore, Grosse Pointe Farms, Mich.

Application February 28, 1938, Serial No. 192,916

10 Claims. (Cl. 155—14)

This invention relates to adjustable seat supports and particularly that type thereof commonly known as seat slides which permit a seat to be slidably shifted bodily either forwardly or rearwardly of a given central position, and while the invention is applicable to this type of seat in general it is particularly applicable to those types thereof employed as the driver's seats of automobiles and which permit the seat to be adjusted toward or from the steering wheel so as to permit the driver to adjust his position with respect to the steering wheel and other control parts of the automobile such as the brake, clutch and acelerator pedals.

Objects of the invention are to provide a seat support of the slide type that is rugged in construction, light in weight and resistant to distortion in service; to provide a seat slide including a novel form of latching means between the relatively movable parts thereof; to provide a novel form of supporting means for the latching mechanism of a slidable seat support; to provide an adjustable seat slide and cooperating latching means so constructed and arranged as to minimize variations in location of parts because of inaccuracies in forming or machining; to provide a seat slide and cooperating latching mechanism including a channeled slide member and the latching means support so constructed and associated therewith as to rigidify the channel structure as well as latch support; to provide a novel means for mounting the latch mechanism of a slidable seat support; to provide a latching mechanism for slidable seat supports that effectively eliminate failure on the part of the latching mechanism to function properly under strains which the normal driver may subject the same thereto; and to provide a novel form of roller mounting for adjustable seat slides.

The above being among the objects of the present invention the same consists in certain novel features of construction and combination of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a front elevational view of a seat of the automobile type provided with a slidably adjustable support;

Fig. 2 is a partially broken side elevational view of the seat shown in Fig. 1;

Fig. 3 is an enlarged side elevational view of that one of the seat supports shown in Figs. 1 and 2 carrying the latch controlling handle;

Fig. 4 is an enlarged fragmentary partially sectioned view taken on the line 4—4 of Fig. 2;

Fig. 5 is an enlarged fragmentary vertical sectional view taken on the line 5—5 of Fig. 4;

Fig. 6 is a view similar to Fig. 5 but illustrating a modified form of construction;

Fig. 7 is a vertical sectional view taken on the line 7—7 of Fig. 3;

Fig. 8 is an enlarged fragmentary vertical sectional view taken on the line 8—8 of Fig. 3;

Fig. 9 is a view similar to Fig. 7, all features being identical thereto except for the construction of the latch operating handle;

Fig. 10 is a view similar to Figs. 7 and 9 except that it shows a modified form of latch operating handle and support therefor; and, Fig. 11 is a fragmentary side elevational view of the construction shown in Fig. 10.

It is conventional practice to slidably support the front seats of automobiles to permit the driver to adjust his position towards and from the steering wheel or other control pedals or members of the automobile to better accommodate his physical structure thereto. These slidable supports usually include a supporting unit at each side of the seat and usually these supporting units are so connected together as to insure their working in unison during adjustment of the seat. One conventional type of these units comprises a member fixed to the floor of the automobile and having a T-shaped head providing a rail which is slidably embraced by a channel member fixed to the bottom face of the seat frame and which channel member carries rollers running upon the rail. The T-shaped member includes a rack and the channel member rotatably supports a pinion in mesh with the rack, the pinions on the opposite units being suitably interconnected for equal rotation thereby insuring corresponding adjusting movements of each channel member, and accordingly both sides of the seat longitudinally of the rails. One of the channel members conventionally supports a latching mechanism including a pivoted arm having an end portion bent to permit engagement thereof with one of a series of notches formed in one side of the corresponding rail thereby to lock the corresponding channel against inadvertent movement on the T-head member. The latching member is constantly urged into latching position by suitable spring means and the handle is provided for moving the latching arm against the force of the spring means out of latching engagement with the rail when it is desired to adjust the position of the seat. Inasmuch as these supporting units are conventionally positioned a material distance inwardly of the outer edges of the seat the handle must necessarily over-hang the corresponding channel by a material amount.

It is particularly in connection with the latching member and operating handle that the present invention is concerned. Forces applied to the handle by the driver not only exert a turning force on the latching mechanism but also exert a bending force on the connection between the handle and channel. In the past the forms of construction provided for supporting the handle on the channel have been such that where the latching mechanism has stuck for one reason or another it has been possible for the driver to place such strain on the latching mechanism and its support through the handle as to frequently distort the latch mechanism, its support, and even the channel, sometimes to such an extent as to permanently damage the same. In this respect it will, of course, be recognized that it is desirable to make the seat support as well as other parts of the automobile as light as possible not only from the standpoint of economy in cost of material, but also economy in the operation and advantages in the performance of the automobile. Thus while distortion of the described channel in particular might be overcome by forming it of heavier gauge material and thus eliminate one of the reasons for failure of present day latching mechanism of the type described, this would offer the objection of increasing the weight and cost of the same.

Another reason of the failure of present day latching mechanism to function properly is that the methods of supporting them in the past have been such that variations in the manufacturing operation of the handle and of its support as well as the securement thereof to the channel have at times accumulated in the same direction and have prevented the latch mechanism from assuming a full latched position, so much so that under strain of an unlatching force the latch may be sprung out of its normally intended cooperative relationship with the edge of the cooperating rail.

In accordance with the present invention a means is provided for supporting the latch mechanism and its operating handle so as not only to partake of the strength of both sides of the channel member but further to actually serve as a stiffening or bracing means between the opposite sides of the channel, thus not only serving to provide a more rigid support for the handle but further to provide increased strength in the channel member itself and still permit a conventionally light, or even lighter than usual, gauge to be employed in the formation of the channel member. Furthermore the support is so constructed and arranged that substantial variations in the forming and/or machining of the various parts of the latching mechanism and its support will have no material effect in varying the proper operative position of the latching mechanism and its cooperating rail.

Referring now to the drawings and particularly Figs. 1 to 8, inclusive, in Figs. 1 and 2 a seat 20 of conventional construction is illustrated as including a seat bottom and seat back portion rigidly connected together. The seat bottom is, of course, provided with the usual base or frame 22 upon which the entire seat structure is built. As illustrated in Figs. 1 and 2, the seat 20 is shown as being slidably adjustably supported upon a pair of supporting units indicated generally at 24, one positioned adjacent each side of the seat; in substantial parallelism with each other and with the corresponding sides of the seat. The two units 24 are substantially identical in construction except reversed in position; that is, one is righthanded and the other is lefthanded, and except that the lefthanded unit, as viewed by a person occupying the seat, is provided with a latch mechanism which, together with the manner in which it co-operates with its corresponding unit, constitutes the principal part of the present invention. Accordingly, a description of the lefthand unit 24 as viewed by an occupant of the seat will be given as illustrative of the construction of both units.

Each unit 24 comprises generally two main parts, namely a base member 26 and a channel member 28. The base member 26 may be of a conventional two part construction in which means are provided for rigidly securing the two parts together in a variety of positions enabling the height and angle or pitch of the seat and its position longitudinally of the automobile to be varied, but for the purpose of simplicity in the drawings, and in the description in the present instance the base member 26 is shown as including a non-adjustable sheet metal part having the plane of its thickness extending vertically and as being provided with a flange 30 along its lower edge for the purpose of providing a means for securing the base member 26 to a floor or other suitable supporting surface. At its upper edge the base member 26 is formed to provide a centrally disposed upwardly projecting gear rack 32 and upwardly projecting stops 34 at the opposite end thereof, its upper edge intermediate each stop 34 in the corresponding end of the gear rack 32 being downwardly relieved as indicated best in Fig. 3.

The upper edge of the base member 26 carries a rail 36 of equal length which, as best shown in Fig. 7, is provided by means of a T-sectioned member formed from sheet metal to provide a pair of centrally positioned downwardly projecting leg portions 38 which are spaced from each other by a distance corresponding to the thickness of the member 26 and receive the upper edge of the member 26 between them and are secured thereto by means of rivets 40. The upper horizontal wall of the rail 36 in alignment with the space between the legs 38 is slotted for a distance and at a location corresponding to the gear rack 32 and the stops 34 so that both the gear rack and the stops project upwardly through the rail 36 to an operative position thereabove as best indicated in Figs. 3 and 7.

The channel member 28 is formed from sheet metal into a channel-like section and as indicated best in Figs. 3, 7 and 8 is positioned in inverted relation with the rail 36 relatively closely but readily slidably received between the open marginal edge portions of the channel, and the marginal edges of the side walls of the channel are inwardly bent as indicated at 42 so as to lie below the outer side margins of the rail 36 and thereby prevent vertical separation between the base member 26 and channel 28. The channel member 28 is adapted to be rigidly secured to the underside of the seat 20, preferably by means of screws or the like (not shown) extending through apertures such as 44 in the base of the channel 28 and, for instance, screwed into the base 22 of the seat in a conventional manner. As indicated best in Figs. 2 and 3 the channel 28 may vary in depth from end to end so that the seat 20 will be supported thereon at the desired pitch or angle.

Each channel member 28 is supported upon its corresponding rail 36 by means of a pair of rollers 46 rotatably supported by the channel member 28 as best illustrated in Fig. 8. As best illustrated in Figs. 4 and 8 each roller 46 is provided with a central groove 48 by means of which the rollers 46 may bridge the gear rack 32 but not the stops 34. Each roller 46 is supported in its corresponding channel member 28 by means of a pin 50. In the past it has been considered necessary that rollers such as the roller 46 be provided with either ball or roller bearing of a suitable type to insure rolling of the rollers on the rails and to prevent rotation of the supporting pin corresponding to the pin 50. I have found that the difficulty with prior constructions is that unless special anti-friction means were provided in the rollers it permitted the pin 50 to rotate and wore the corresponding holes in the channel to such an extent that the bearing for the rollers became the area of contact between the pins and the channel rather than between the pins and the roller, and for this reason made it extremely difficult to cause shifting of the seat when supporting the weight of the driver. Accordingly, one feature of the present invention is the provision of a means for supporting such rollers as to eliminate the necessity of the anti-friction bearings therein and to positively prevent rotation of the supporting pin.

The above is accomplished as best illustrated in Fig. 8 by forming a square or other non-circularly shaped shoulder 52 on the pin 50 adjacent the head 54 thereon and forming a corresponding opening in the corresponding side of the channel member 28 for reception of the same. The opposite end of the pin 50 is, of course, round and projects through a similarly shaped opening in the opposite wall of the channel member 28 and the pin is held in place with the non-circular shoulder 52 in its correspondingly shaped opening by means of a cotter pin 56. This construction positively eliminates the possibility of the pin rotating in the channel member 28 and insures that the bearing for the roller 46 will comprise the area of contact between it and the pin 50, and it has been found that with this construction seats of the type under discussion may, as far as practical results are concerned, be as readily adjusted along the rails 36 as where relatively expensive anti-friction means are provided between the roller and the pin, and the cost of the construction is materially less.

As indicated best in Figs. 3 and 4 the inner walls of each channel member 28 at equivalent points in the length of the same are each provided with a relatively large inverted U-shaped opening 60 therein cutting through the lower edge of the wall and the outer wall of each channel member 28 in horizontal alignment with the opening 60 therein is provided with a bearing collar 62 fixed therein as shown in Fig. 4. Between the bearing collars 62 of each unit 24 a shaft 64 extends and is rotatably received at its ends in the bearing collars 62. The shaft 64 at each end thereof is provided with a gear 66 fixed thereto and lying in mesh with the corresponding rack 32. The outer faces of the gears 66 abut against the opposed axial face of the corresponding collar 62 thereby preventing axial movement of the shaft 64 and maintaining the gears 66 axially in mesh with their corresponding gear racks 32. The gears 66 are secured against rotation to the shaft 64 and in this manner equal longitudinal sliding movement of the channel members 28 is assured during slidable adjustment of the seat 20 on the rails 36, as well as holding both channel members in adjusted position by latching only one thereof. The rollers 46 for each channel member 28 are so located in the length of the same that they will contact their corresponding stop members 34 to prevent such longitudinal movement of the channel members 28 longitudinally of the rails 36 as would permit disengagement of the gears 66 and their racks 32.

With the construction as thus far described and which, except for the novel means of mounting the rollers 46, is conventional, it will be apparent that the seat 20 may be readily shifted longitudinally of the rails 36 simply by applying manual pressure thereto and that the weight of the seat and occupant thereof is transmitted to the rail 36 from the channel 28 through the rollers 46 which thus provides means permitting ready shifting of the seat 20 while supporting the weight of the driver and/or other occupant. Means are provided for releasably latching the seat 20 in any one of a plurality of different positions along the rails 36 and it is in connection with this feature that the present invention primarily deals.

The conventional method of latching the above types of mechanism in longitudinally adjustable position includes the provision of a series of notches, such as the notches 70 illustrated in Fig. 4 in the outer edge of one of the rails 36, and the provision of a latch arm such as the arm 72 provided with an end or latch 74 adapted to project through a slot in the outer side wall of the channel member 28 and to be received in one of the notches 70 thereby to maintain the channel 28 against movement on the rail 36. The conventional practice in the past has been to rotatably mount the arm corresponding to the arm 72 on a pin supported by the outer wall only of the channel 28. Such arms as the arms 72 are provided with an operating handle which is positioned a material distance laterally outwardly of the corresponding face of the channel member 28 so that where the latch 74 becomes stuck in a notch 70, as may readily occur when the weight of a driver is upon the corresponding seat 20 and sliding pressure is being applied to the seat at the same time, sufficient force may be applied to the handle to temporarily and sometimes permanently distort the outer wall of the channel 28, thus either temporarily or permanently disabling the latching mechanism, which makes it extremely inconvenient if not actually dangerous to drive the automobile in which the seat is located for the reason that the driver will thus usually be placed in an unnatural driving position. Another difficulty in conventional constructions has been that in supporting the latch arm 72 and the corresponding handle upon its supporting pin, relatively widely spaced points axially of the pin have been relied upon to maintain the arm 72 against movement axially of the pin. Accordingly, variations in forming the handle or locating the holes or other locating surfaces on the pin occasionally accumulate to provide a sufficiently great amount of movement of the latch arm on the pin to permit the latch to become disengaged from the notches in the rail, thus destroying the effectiveness of the latch with all of the attendant disadvantages. All of the above disadvantages are eliminated by the latch construction and method of support provided in accordance with the present invention and which will now be described.

The latch arm 72 in accordance with the present invention is preferably formed as shown as an integral part with the shank 76 for the handle 78. As illustrated in Fig. 7 the outer end of the shank 76 is upturned as at 80 and the handle 78 is formed of lighter gauge sheet metal so as to embrace the end 80 and to be supported thereby. In order to prevent possible looseness of the handle 78 on the end 80 the lower end of the handle, as viewed in Fig. 3, tapers in width over the major portion of the length, becoming wider toward the shank end 80 the side edges of which are tapered correspondingly and are closely embraced by the inwardly turned marginal portions of the corresponding portion of the handle 78. Additionally the lower end of the handle 78 is inturned as at 82. The inturned end 82 prevents upward movement of the handle 78 with respect to the end 80 and the tapered relation of the handle 78 and the end 80 prevent downward movement of the handle 78. Thus a simple, cheap and effective connection is provided between these parts.

The latch and handle assembly is rotatably supported upon a pin 84 which is relatively rotatably received in suitable apertures formed in both the latch arm 72 and the end portion 80. In this connection it will be noted that the handle portion 78 masks the outer end of the pin 84. The pin 84 is provided with an upset shoulder or abutment 86 thereon against which the inner face of the latch arm 72 abuts to limit its movement in that direction, and a cotter pin 88 projected through the pin 84 immediately in advance of the outer face of the latch arm 72 prevents movement of the latch arm 72 in a corresponding direction. Thus the means for limiting axial movement of the latch and handle assembly on the pin 84 is accomplished solely by means engaging opposite faces of the latch arm 72. In this respect it will be understood that the sheet metal stock from which the latch arm 72 and shank 76 are formed will vary little if any in thickness and the provision of the upset shoulder 86 on the pin 84 permits of locating the hole for the cotter pin 88 with respect thereto so accurately and simply that any variation occurring in the spacing of the hole for the cotter pin 88 from the shoulder 86 will be negligible in any case. Accordingly, any variation in spacing between the latch arm 72 and end portion 80 in the forming of the handle assembly will have no effect whatever in permitting axial variation in the position of the handle assembly on the pin 84 and which, as above described, often occurs in the conventional methods of axially locating these parts.

In order to support the pin 84 on the channel member 28 a bracket member 90 is provided. The bracket member 90 has an aperture therein which closely receives the shaft 84 and the end of the shaft is projected through such opening until the shoulder 86 abuts the outer face of the bracket and then the inner end of the pin 84 is peaned over as indicated at 92 in Fig. 7 so as to rigidly fix the pin 84 with respect to the bracket 90. The bracket is then secured to the outer face of the channel member 28 in order to complete the support for the pin 84. As previously explained it has been the practice heretofore in thus mounting the pin on the outer face of the channel 28 to so secure it or its bracket with respect to the channel member 28 that substantially only the outer wall of the channel serves as a support for the pin and consequently the latch and handle mechanism. As will be readily observed where such mountings for pin have been provided, a substantial pull on the end of the handle 78 is greatly multiplied in its effects on the outer wall of the channel member 28, with the result that in the past permanent distortions of the channel member have not been at all uncommon, and deflection of such outer wall upon each operation of the handle 78 to operate the latching mechanism has been a usual occurrence.

In order to overcome the above disadvantages in the present construction the bracket member 90 is fixed to the channel member 28 in the following manner. Rivets 94 are extended completely through the channel member 28 and through the bracket 90 and the opposite ends thereof are headed over. Within each channel member suitable spacing means are provided between the opposite walls of the channel member 28 at or adjacent each rivet. These spacer means may be of any desirable construction or conformation and may comprise, for instance, simple cylindrical sleeves 96, shown in the majority of the views, as the preferred form, and best illustrated in Fig. 5, although as illustrated in the modified view shown in Fig. 6 the spacers may take the form of a pair of sleeves such as 96' surrounding their corresponding rivets 94 and integrally connected by means of a bar 98. This last described construction permits the formation of the spacer means from a strip of sheet metal by simply rolling up the opposite ends of the strip to provide the sleeves 96'. In any event the spacers 96 act to space the interior walls of the channel member 28 so that when the rivets 94 are headed over both walls of the channel 28 adjacent the rivets are clamped against the corresponding ends of the spacers and thereby rigidly fixed with respect to each other against both separative and contractive movements. Thus the combined action of the rivets and spacers is to render this particular portion of the channel members 28 materially more rigid and of greater strength than in its original condition. Inasmuch as the pin 84 is joined to the channel member 28 at a location in which the strength of the channel member is increased, it provides a support for the pin 84 which partakes of the strength of both walls of the channel member at a point where they have been reinforced. The construction thus provides one in which the entire channel at the point of support for the pin 84 is utilized for resisting any deflecting movements of the pin 84 under forces applied to the handle 78, and tests have shown that the construction is amply sufficient to withstand even the most abnormal forces which the handle and latch mechanism may be subjected to in normal service, the result being that the latch mechanism remains fully operable under the most adverse conditions.

As in conventional constructions a coiled spring such as the spring 100 is tensioned between the latch arm 72 and the channel member 28 to constantly urge the latch 74 into operative relation with respect to a notch 70 in the rail 36. Also in accordance with conventional practice the bracket member 90 is provided with a stop member 102 and the latch arm 72 with a projection such as the projection 104 illustrated best in Fig. 3 adapted to engage the stop member 102 when the latch 74 has been completely withdrawn from the corresponding notch 70 so as to limit movement of the handle 78 in its releasing direction.

Referring to Fig. 9 a modified form of construction is shown for the latch handle portion 78 of the device as well as in the means for supporting the same. In this figure the same numerals indicate the same parts as shown in the previous figures where such parts are identical and are indicated by the same numerals except the numerals bear a prime mark where any of such parts have been modified. Accordingly it will be noted in this case instead of providing a separate sheet metal handle portion secured to a portion such as the portion 80 in the previous views, the shank portion 76' of the handle is extended as at 78' to the same extent as the handle 78 previously shown and described so as to directly provide the handle. This is a cheaper construction than that previously described but may not be as presentable in appearance.

Another change in Fig. 9 as compared to the construction shown in the previous views is that the pin 84' in this case is shorter than the pin 84 previously described and instead of having bearings at its outer end the upturned portion of the shank 76', a lug or ear 110 is struck out from the central portion of the shank 76' and is bent into perpendicular relationship with respect thereto and is provided with an opening for reception of the outer end of the pin 84' therein so as to provide a bearing therefor. Other than the specific features just discussed the construction shown in Fig. 9 is identical to that disclosed in the previous figures.

In Figs. 10 and 11 a further modified form of construction is shown. The main difference in this construction is that instead of supporting the pin 84'' by means of a bracket 90 as disclosed in the previous figures, the inner end of the pin 84'' in this case is not provided with any such bracket but instead is itself projected clear through the opposite walls of the channel 28 and is provded with a spacer collar 112 within the channel member 28 extending between opposite walls thereof. The inner end of the pin 84'' in this case is peaned over as indicated at 114 with the upset collar 86'' bearing against the opposite outer face of the channel 28. Thus in this case the same rigid connection between the opposite walls of the channel 28 is provided as in the previous construction except that the bracket 90 is eliminated. The handle and latch arm construction 72'', 76'' and 78'' is substantially identical to that disclosed in Fig. 9 with the exception that because of the fact the pin 84'' projects completely through the channel 28 it is necessary to place it sufficiently high so as to clear the top of the rack gear 32 within the channel, whereas in the previous construction the center of the pin 84 or 84' as the case may be is located substantially central of the track 36. In the previously described constructions the position of the pins 84 provide substantially vertical movement of the latch 74 into and out of the notches 70 in the track 36, whereas in the construction shown in Figs. 10 and 11 the slot 115 in the channel 28 for reception of the latch 74'' must necessarily be substantially perpendicular to a line drawn from its midpoint through the axis of the pin 84'' and consequently must be angularly disposed with respect to the lower edge of the channel member 28 as indicated in Fig. 11. A different method of limiting unlatching movement of the handle 78'' is also indicated in Figs. 10 and 11. In this case the latch arm 78'' is provided with an inwardly turned finger 116 which extends through an arcuate slot 118 in the corresponding side wall of the channel 28. Contact of the latch 116 with the bottom end of the slot 118 provides means for limiting the unlatching movement of the handle 78'' in this construction. All of the benefits of the previously described constructions, however, are present in this last described construction.

Formal changes may be made in the specific embodiments of the invention described without departing from the spirit or substance of the broad invention, the scope of which is commensurate with the appended claims.

What I claim is:

1. In a seat slide mechanism including a rail member and a channel member slidably supported on said rail member for movement longitudinally thereof, and a latch member pivotally supported by said channel member and cooperable with said rail member to latch said channel member in any one of a plurality of adjusted positions thereon, the combination of means for pivotally supporting said latch member comprising a pin, and means for supporting said pin on said channel member including means spacing the interior walls of said channel member and means rigidly fixed with respect to said pin cooperating with the exterior surfaces of the opposite side walls of said channel member adjacent said spacing means clamping said opposite walls against the corresponding ends of said spacing means.

2. In a seat slide mechanism including a rail member and a channel member slidably supported on said rail member for movement longitudinally thereof, and a latch member pivotally supported by said channel member and cooperable with said rail member to latch said channel member in any one of a plurality of adjusted positions thereon, the combination of a pin providing a pivotal support for said latch member, a bracket rigid with respect to said pin, and means extending through said bracket and completely through the opposite walls of said channel member for fixing said pin with respect to said channel member, and rigid means interiorly of said channel member in the region of the first mentioned means holding the opposite walls of said channel member in spaced relationship against the action of the first mentioned means whereby to positively tie the opposite wall of said channel members together against both contractive and expansive movements with respect to each other adjacent the point of support of said pin thereon.

3. In a seat slide mechanism including a rail member and a channel member slidably supported on said rail member for movement longitudinally thereof, and a latch member pivotally supported by said channel member and cooperable with said rail member to latch said channel member in any one of a plurality of adjusted positions thereon, the combination of a pin projecting outwardly of a side wall of said channel members providing a pivotal support for said latch member, means positioned interiorly of said channel member adjacent the location of said pin and extending between the opposite side walls thereof for preventing contractive movement of said opposite walls over that area thereof adjacent said means, and means fixed with respect to said pin extending completely through said channel members and urging the opposite side walls of said channel member firmly into contact with said means and maintaining said opposite side walls over said areas thereof against relative spreading movement with respect to each other.

4. In a seat slide mechanism including a rail member and a channel member slidably supported on said rail member for movement longitudinally thereof, and a latch member pivotally supported by said channel member and cooperable with said rail member to latch said channel member in any one of a plurality of adjusted positions thereon, the combination of a pin projecting laterally from said channel member and providing a pivotal support for said latch member, an abutment on said pin abutting an outer face of a side wall of said channel member, an extension on said pin projecting completely through said channel member, means interiorly of said channel member adjacent said extension positively spacing the opposite side walls of said channel member adjacent said extension from contractive movement with respect to each other, that end of said extension remote from said abutment cooperating with the outer face of the corresponding side wall of said channel member whereby to cooperate with said abutment to prevent spreading action of the opposite walls of said channel over those areas thereof adjacent said extension.

5. In a seat slide mechanism including a rail member and a channel member slidably supported on said rail member for movement longitudinally thereof, and a latch member pivotally supported by said channel member and cooperable with said rail member to latch said channel member in any one of a plurality of adjusted positions thereon, the combination of a pin projecting laterally from a side face of said channel member, a radially projecting abutment on said pin, a bracket member receiving that portion of said pin on one side of said abutment and rigidly secured thereto, means fixing said bracket with respect to said channel member, said latch member being rotatably received by said pin in contact with that face of said abutment opposite said bracket member, and means cooperating with said pin and that face of said latch member on the side thereof opposite said abutment for maintaining said latch member against movement axially of said pin.

6. In a seat slide mechanism including a rail member and a channel member slidably supported on said rail member for movement longitudinally thereof, and a latch member pivotally supported by said channel member and cooperable with said rail member to latch said channel member in any one of a plurality of adjusted positions thereon, the combination of a pin fixed with respect to a side face of said channel member and projecting outwardly therefrom, said latch member being journaled upon said pin, a handle member journaled upon the outer end of said pin, and a handle shank rigid with respect to said handle and integral with respect to said latch member interconnecting said latch member and handle.

7. In a seat slide mechanism including a supporting member provided with a rail, a channel member slidably supported on said rail for movement longitudinally thereof, and a pin rigidly fixed with respect to a side wall of said channel member and projecting laterally therefrom, the combination of a latch member pivotally mounted upon said pin adjacent said channel member and cooperable with said rail to releasably latch said channel member in its adjustable position thereon, a handle shank integral with said latch member and projecting outwardly therefrom in a direction longitudinal of said pin, means on said shank member cooperating with the outer end of said pin to provide an outboard bearing for said latch member, and a handle rigid with respect to the outer end of said shank.

8. In a seat slide mechanism including a supporting member provided with a rail, a channel member slidably supported on said rail for movement longitudinally thereof, and a pin rigidly fixed with respect to a side wall of said channel member and projecting laterally therefrom, the combination of a latch member pivotally mounted upon said pin adjacent said channel member and cooperable with said rail to releasably latch said channel member in its adjustable position thereon, a handle shank integral with said latch member and projecting outwardly therefrom in a direction longitudinal of said pin, means on said shank member cooperating with the outer end of said pin to provide an outboard bearing for said latch member, and a handle rigid with respect to the outer end of said shank, said handle comprising a separately formed sheet metal part the marginal edge portions of which are inwardly turned into embracing relationship with respect to the outer end of said shank.

9. In a seat slide mechanism including a supporting member provided with a rail, a channel member slidably supported on said rail for movement longitudinally thereof, and a pin rigidly fixed with respect to a side wall of said channel member and projecting laterally therefrom, the combination of a U-shaped member the opposite legs of which rotatably receive said pin therein, that one of said legs closest to said channel member being formed for releasable engagement with said rail member whereby to releasably latch said channel member in longitudinally adjusted position on said rail member, the opposite leg of said U-shaped member being formed to provide a handle, a radial abutment on said pin adjacent said channel member and against which said nearest leg of said U-shaped member abuts, and means cooperating between the opposite face of the last mentioned leg of said U-shaped member and said pin limiting said U-shaped member against axial movement on said pin.

10. In a slidable seat support having a rail member and a channel member supported on said rail member for slidable movement longitudinally thereof, a pin fixed to a side wall of said channel member and projecting outwardly therefrom, and a latch member rotatably mounted on said pin adjacent said channel member, an end of said latch member being cooperable with said rail member to releasably latch said channel member in one of a plurality of longitudinally adjustable positions on said rail member, the combination of a handle shank rigid with respect to said latch member projecting outwardly from said channel member, an ear projecting laterally from said shank intermediate the ends thereof and rotatably embracing said pin to provide an outboard bearing for said latch member, and a handle rigid with respect to the outer end of said shank member and extending in a direction transverse to the axis of said pin.

RAYMOND G. MOORE.